Feb. 29, 1944.　　A. R. RIDDERSTROM　　2,343,226
SHOEMAKING
Filed Nov. 19, 1941　　3 Sheets-Sheet 1
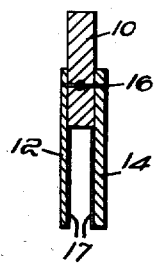
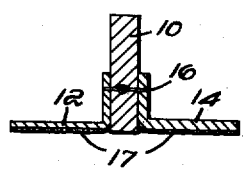
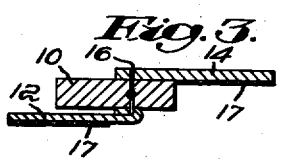
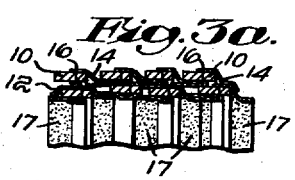
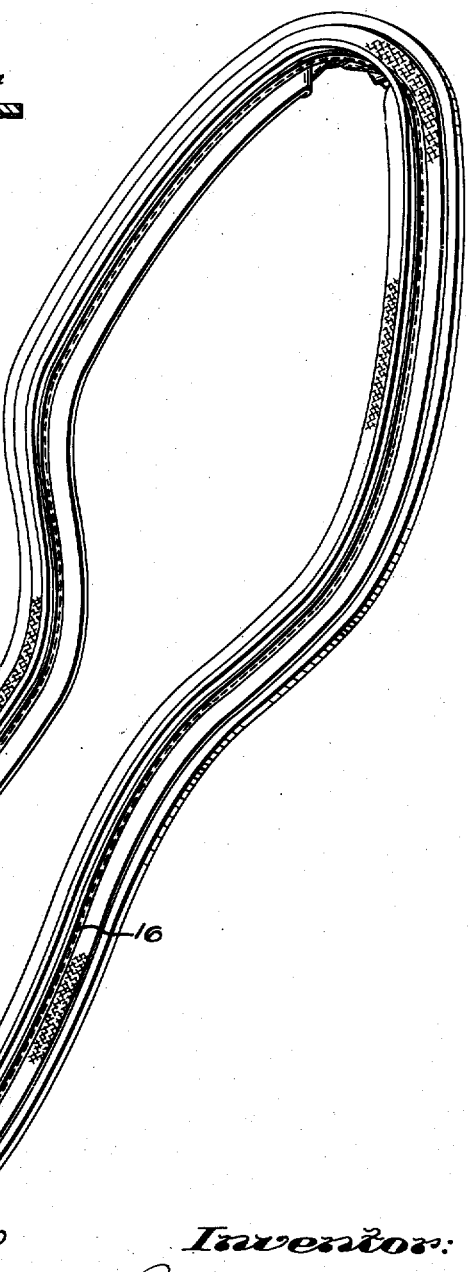

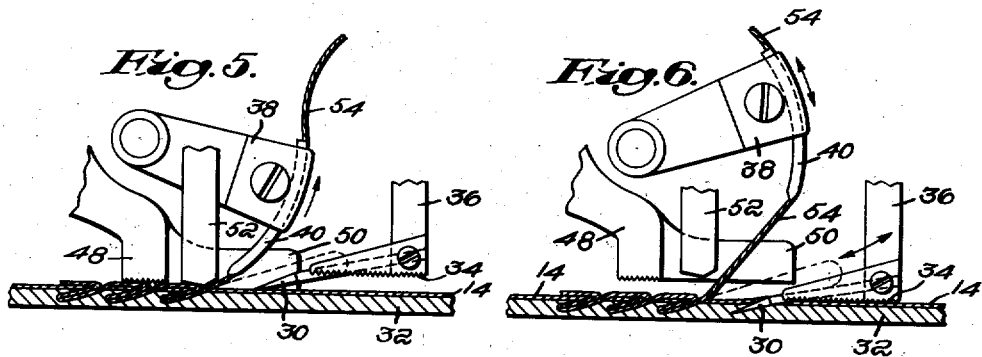
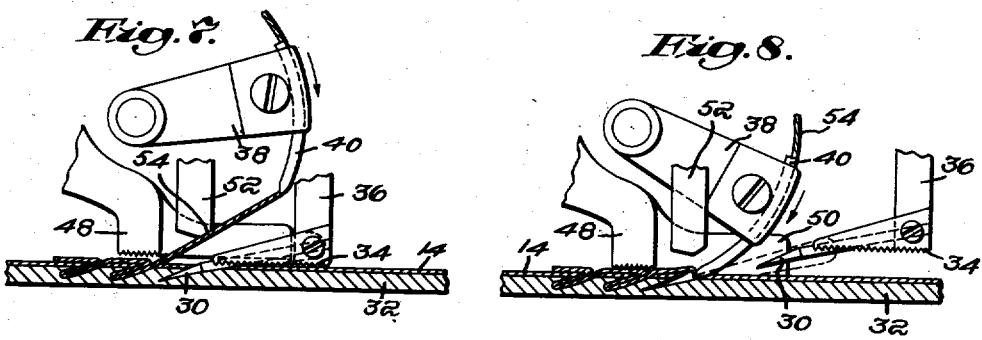
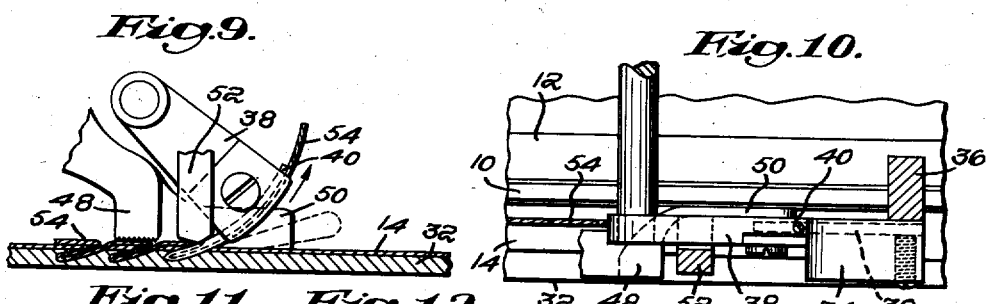
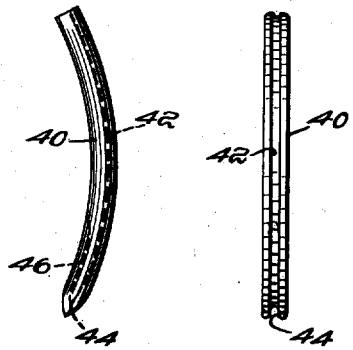
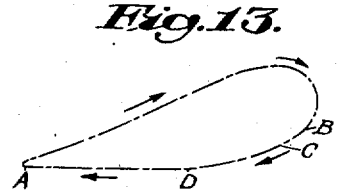

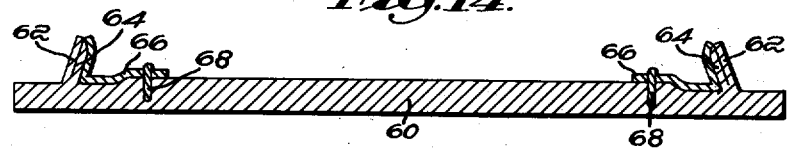
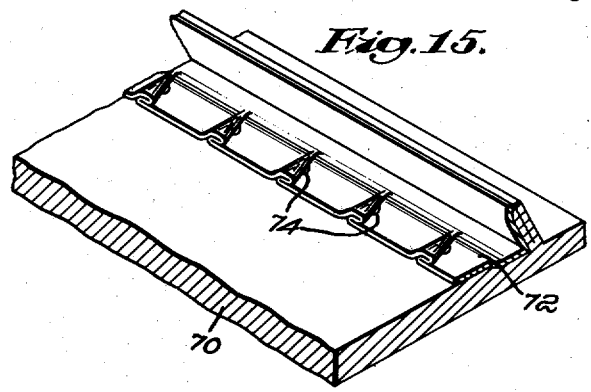
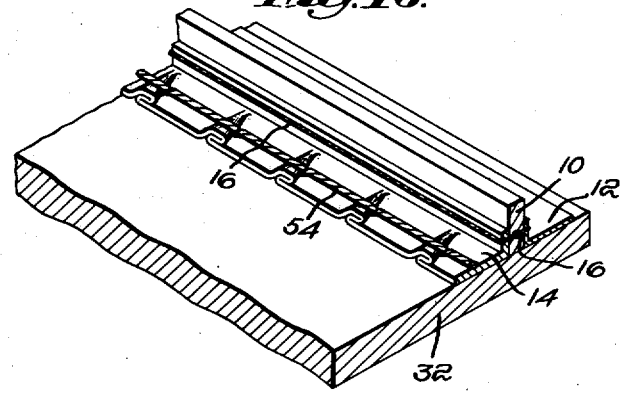

Patented Feb. 29, 1944

2,343,226

UNITED STATES PATENT OFFICE 2,343,226

SHOEMAKING

Andrew R. Ridderstrom, Nahant, Mass., assignor to Prime Manufacturing Company, Lynn, Mass., a corporation of Massachusetts Application November 19, 1941, Serial No. 419,744

14 Claims. (Cl. 12—146)

This invention relates to ribbed insoles of the type used in making welt or Littleway shoes and consists in an improved process of making such insoles characterized, in one aspect, by the step of bringing to the insole blank, for attachment thereto, a pre-assembled composite ribbed strip comprising a core and cohesive tape ready for immediate application to the insole.

The invention includes within its scope the improved insole produced in accordance with the process of my invention and also the novel preformed composite ribbed strip used in carrying out the process of my invention.

Heretofore, cohesive or adhesive tape and core material have been led separately to the insole blank, progressively conformed to each other, and simultaneously applied to the insole. This has always been a very exacting operation requiring skill and perfectly adjusted machinery by no means easy to attain continuously in the varying conditions of commercial shoemaking. Where it is the practice to conform the tape to the core and simultaneously apply or attach these parts to the insole, it ofen happens that the margin of the tape varies from place to place along the rib and that intervals of scant margin occur resulting in weak spots in the rib. One object of the present invention is to improve the accuracy of the rib construction and secure a rib uniform in appearance and in strength throughout its length by accurately pre-assembling and combining the core and tape where this step can be carried out under more favorable and more accurate conditions than at the time of applying the rib to the insole. Since the core is uniform in cross section and stiff in texture, it may be handled accurately at high speed and combined and united with one or more strips of tape all under favorable and advantageous conditions.

Preferably and as herein shown two narrow tapes are employed, one positioned on each side face of the rectangular core and secured thereto by a single line of stitching. This results in a valuable saving of material since it is unnecessary to carry the tape over the top edge of the core. The top of the rib is trimmed in shoemaking after the lasting and welt sewing operations in accordance with the thickness of the welt. Where a thin welt is employed a substantial portion of the rib is trimmed away, and, by leaving the top edge or the upper portion of the core uncovered by tape, as is done in carrying out my invention, a strip of material at least $\frac{1}{16}$" wide is saved which is otherwise only waste.

Another advantage of the process of my invention is that it is thereby entirely practical to use a heavy tape on the inside of the rib where it is required to resist the strain of the inseam stitches, and a light tape on the outside of the rib where it is subjected to no further strain than merely that of holding the rib down in place on the insole during the lasting operation.

Still another feature of my invention consists in providing additional securing means for the tape forming the flange of the rib in the shape of sliced or stab stitches carrying a line of thread through the flange of the tape and obliquely into the body of the insole in the form of loops which are anchored or sealed in place by adhesive and pressure. This additional securing means for the rib obviates the necessity of employing the gem duck reinforcing blank which has been found necessary heretofore in the manufacture of Economy Insoles and provides the same strength of rib by using only narrow tape along the rib itself.

In another aspect my invention relates to the reinforcement of a sewing rib formed primarily by channeling an insole to produce adjacent marginal lips which are turned up and cemented together in upright position. Hitherto large blanks or blocks of gem duck have been placed on soles so channeled; the gem duck has been cemented to the sole and to the inside of the rib and later trimmed off flush with the top of the rib. The gem duck reinforces the rib and the insole. I have discovered that a satisfactory reinforced insole may be produced by laying a relatively narrow band or tape of gem duck on the channeled sole to cover the inside of the rib and the adjacent marginal portion lying within the rib. Subsequently the tape is stitched to the sole by the sliced stitches referred to above. The product is fully as strong as a sole provided with the relatively large blank of gem duck and is much cheaper than an insole having width reinforcing blank because of the saving in material. My invention as carried out in the reinforcing of channeled insoles is not claimed herein but is the subject-matter of my co-pending divisional application Ser. No. 497,666, filed August 6, 1943.

I have also solved the troublesome problem of eliminating the large folds or bunches, in the tape at the toe portion, which not only result in an insole of poor appearance but also interfere with accurate sewing of the upper to the sewing rib. To eliminate the objectionable bunching of the tape, I provide an awl or other sharp tool which is arranged to jab the tape repeatedly in an inclined or sloping path and at short intervals simultaneously with the laying of the tape. The jabs of the awl form small neat pleats in the tape as it progresses around the toe portion of the insole. It is furthermore desirable to provide a hammer which follows the awl and is arranged to hammer the pleats down flat. In other words the excess material, resulting from the bending of the tape around the curve of the toe, is distributed in many small pleats of small bulk instead of being allowed to gather in a few bulky folds.

These and other objects and features of the invention will best be understood and appreciated from the following detailed description of a preferred embodiment thereof selected for purposes of illustration and shown in the accompanying drawings in which—

Figs. 1–3 are views in cross section, on an enlarged scale, through a core and associated strips of tape, Fig. 3a is a fragmentary view of a coil of ribbing as supplied by the manufacturer, Fig. 4 is a view in perspective of an insole embodying the sewing rib of my invention, Figs. 5–9 are views in side elevation showing the movements of a mechanism for securing the flange of the sewing rib to an insole by stab-stitching, Fig. 10 is a plan view of the mechanism shown in Figs. 5–9, Fig. 11 is a view in front elevation of the saddle needle, Fig. 12 is a view in side elevation of the saddle needle, Fig. 13 is a diagram showing the path traveled by the awl, Fig. 14 is a view in cross-section through an insole embodying a modified form of the invention, Fig. 15 is a view in cross-section through the toe portion of an insole, and Fig. 16 is a fragmentary view in cross section on an enlarged scale through the toe portion of a modified form of insole.

Making the rib

At the outset it should be stated that an important aspect of my invention consists in assembling ribbing in strip form and coiling it in reels which may be supplied to shoe manufacturers, a practice in contrast with systems heretofore in use wherein the ribbing has been formed by the same machine which simultaneously applied it to the insole. A relatively stiff core strip 10 made of cardboard or similar tough fibrous material forms the inner element of the sewing rib of my invention. To the opposite sides of the core 10, which is shown in Fig. 1 as substantially rectangular in cross section, is stitched a pair of tapes 12 and 14, one of which is preferably, but not necessarily, somewhat thicker and heavier than the other. The line of stitching 16 secures the upper margins of the tapes to the core slightly below the center of the latter. The upper half of the core 10 is accordingly uncovered, the lower portions of the tapes 12 and 14 extending considerably below the lower edge of the core 10, as shown in Fig. 1. The inner faces of the tapes 12 and 14 are coated with cohesive cement 17, that is, cement which will stick to other cemented surfaces but not to unprepared surfaces.

The tape 12 is then turned or folded upwardly and pressed flat against the side of the core 10 with its cohesive coating facing outwardly. The result is illustrated in Fig. 3. The ribbing thus formed may, as appears in Fig. 3a, be wound upon a reel to form a coil. Since the cohesive cement coating 17 of both the tapes 12 and 14 faces in the same outward direction it will, when coiled, come in contact only with uncoated portions of the ribbing, and will not stick. Otherwise the coil would consist of laminations cemented together, and it would be impossible to unroll the tape from it.

Laying the rib

When the coiled ribbing is to be used, it is fed through a machine which first directs the core 10 in upright position to the insole blank, as shown in Fig. 2, also turning the tapes 12 and 14 to form two opposed base flanges perpendicular to the core 10, and then lays the rib along the margin of the insole 20, which has previously been coated with cohesive cement. The cement 17 of the ribbing and the cement on the insole 20 form a firm bond permanently securing the base flanges of the tapes to the insole with the core 10 held between them in upright position. It will be evident that the cement holds the flanges of the tapes to the insole 20, but since no cement is applied to the core 10, it is the stitching 16 which holds the core 10 through the medium of the tape securely to the insole and in upright position. After an upper has been lasted to the insole by lasting tacks, staples, or other means, the upper is sewn to the rib, using the conventional curved needle which forms a seam running along the base of the rib beneath the line of the stitching 16. Subsequently the overlasted edge of the upper and the upper portion of the rib are trimmed off.

It is to be understood that instead of using two separate tapes, a single tape may be used which carries over the top of the core 10 and extends down on either side of it. However, this is usually a more wasteful process than the preferred process heretofore described in view of the fact that most of the portion of the single tape which extends above the line of stitching is always trimmed off later on in the shoemaking process. Furthermore, when two tapes are used in manufacturing the ribbing, the upper portion of the core 10 may be received between guide members which register the core with respect to the two pieces of tape and thus ensure that the tapes will be stitched to the core precisely along a predetermined line. Such precision is impossible when a single piece of folded tape is used and experience has shown that it is very difficult to lay a single piece of tape about a core at high speed and with such accuracy that the width of the base flanges is held to a uniform dimension. There is also the additional advantage when separate tapes are used of being able to employ a tape of greater thickness on the inside of the rib where greater strength is required by the shoemaking process.

Stitching the rib to the sole

It has been the practice in shoemaking, when sewing ribs are either applied to an insole or formed by channeled lips, to superpose a rectangular piece of gem duck over the whole insole blank, press the gem duck upon the sole in the area lying within the rib, conform the gem duck to the inside of the rib, and then trim off the large excess of gem duck projecting above the top of the rib. The gem duck reinforces the sole and provides a firm anchorage for the seam joining the upper and the sewing rib, since the upturned edge portion of the gem duck forms another ply of such a rib. I have discovered that the application of gem duck in this fashion can be eliminated entirely without impairing the quality of the product. I accomplish this result either in conjunction with the use of the sewing rib heretofore described or in conjunction with an insole in which a sewing rib has been channeled. In the first instance the inside tape 14 is made of heavy duck and the sewing rib is applied to an insole as previously discussed. However, in accordance with my invention, the inside tape 14 may be secured to the insole not only by the cohesive cement described above, but by a process of loop stitching carried on progressively and simultaneously with the application of the sewing rib to a flat sole blank, and which will now be described in detail.

An awl is used to make a slanting cut or stab through the tape 14 and into but not through the material of the body of the insole. Subsequently a forked needle inserts and deposits a loop of thread in the hole formed by the awl, and finally pressure is applied from above tending to close or collapse the sides of the hole about the inserted loop of thread. Preferably the thread is impregnated with an adhesive which sets very quickly under the application of pressure and contributes to form a secure anchorage for the stitch. Since the stitches are not carried through the sole, the opposite surface of the sole which is exposed inside the shoe will be smooth and unbroken.

To carry out the process of securing the inside tape to the sole by looped stitching, I prefer to use the mechanism shown in Figs. 5–12. This may include an awl 30 carried at the end of an arm 36 and set at an acute angle with relation to the surface of an insole 32 as it is fed into the machine. At the bottom of the arm 36 is a feed foot 34 having a horizontal bottom provided with corrugations or teeth. The motion of the awl 30 and the feed foot 34 is indicated by the diagram in Fig. 13 and is obtained by the use of eccentric mechanism of the general type disclosed in my prior Patent No. 1,794,204. In the indicated path the distance A—B is the withdrawal stroke. At B the awl meets the surface of the tape on the sole and the inclined and curved path B—C represents a period during which the awl 30 is pressed with increasing force downwardly upon the surface of the tape 14, with very little forward movement. The distance C—D represents the movement of the awl through the tape 14 and into the insole 32. Since the point of the awl projects considerably below the corrugated surface of the feed foot 34, the feed foot does not come into contact with the tape 14 until the point D is reached. From D to A the awl and the feed foot which is then in contact with the tape 14, are moved to the left. Since the feed foot 34 is in contact with the tape, the awl is not moved with respect to the sole during its travel along the path D—A and the result is that the sole 32 is fed to the left. At the point A the withdrawal begins and the cycle is repeated.

Behind the awl 30 is located a curved needle carried in the end of a short arm 38. As clearly shown in Figs. 11 and 12 the front side of the needle is grooved to provide a thread-carrying slot 42, and the point of the needle is recessed or forked as shown at 44. The rear side of the needle has a short groove or slot 46 extending upwardly a short distance from the point. A supply of thread 54 impregnated with a suitable adhesive, cement or hot wax, for example, is placed above the needle 40. Behind the needle is a hammer 48 which bears on the surface of the work to hold it firm while the awl and the needle enter the material. Integral with the hammer 48 is a thin leaf extension 50 which presses the tape 14 tightly down on the surface of the insole at the edge corner formed by the core 10 and the insole. A presser foot 52 is arranged between the hammer and the needle and is provided with a pointed lower end.

In Fig. 5 the instrumentalities above described are shown in their relative positions after a stitch has been formed and the awl 30 is about to enter the material at an acute angle to form an oblique pocket for the reception of the next stitch. In Fig. 6 the hammer 48, the needle 40 and the presser foot 52 are elevated; the awl has made its hole and its at the point represented by D in the diagram of Fig. 13. The feed foot 34 is now in contact with the surface of the tape 14 and the sole is about to be fed to the left.

In Fig. 7 the feed foot 34 is shown as having fed the sole to the left and the hammer has begun to come down again. The awl is now ready to leave the material. Before the awl leaves the material entirely and before the hammer comes in contact with the material, the insole 32 can be swung around the awl, since that is all which then holds the insole. This allows the operator to swing around a sharp bend, as at the toe end of the insole, without moving the hole formed by the awl from its proper position. In Fig. 8 the hammer is shown as having come in contact with the work to hold it firm, the awl is lifted away and the needle carrying the thread 54 is about to enter the hole made by the awl. In Fig. 9 the needle is shown as having reached the bottom of the hole made by the awl and the presser foot 52 has come down to bear upon the surface of the tape and press the upper side wall of the hole against the thread which has then been looped over the point of the needle and into the slot 46. The result is that when the needle is withdrawn, the presser foot will retain the thread in the awl hole, and after the needle has been withdrawn the pressure of the presser foot will set the adhesive carried by the thread and also close the walls of the hole about the deposited loop of thread. The cycle then begins again, and when the hammer 48 returns to the work, it will flatten out the stitch just formed.

When a suitable quick setting adhesive is used on the thread 54 and the presser foot 52 and 48 have done their work, it will be found that the stitches cannot be pulled out. In fact they are so securely held in place that the material of the insole will tear before the stitches will yield.

The application of the process of my invention to a channeled insole is illustrated in Fig. 14. A leather insole 60 has formed in its lower margin a rib obtained by channeling in from the edge of the sole to raise a lip 62 and channeling from the inside of the sole 60 to form a lip 64. The lips 62 and 64 are raised to vertical position and cemented together. A tape 66 is then laid on the sole so that one portion is upright and in contact with the inside of the lip 64 and the remainder of the tape 66 extends along the portion of the insole 60 from which the lip 64 was channeled and up along the adjacent margin of the unchanneled interior portion of the sole 60. With the mechanism described above the loop stitching 68 is formed to secure the tape 66 to the insole 60. The stitching 68 is preferably laid through the tape and the unchanneled portion of the insole 60, since the thickness of the insole adjacent the rib may not be great enough to permit stitching of adequate depth.

I have found that by stitching a tape to an insole in the manner above described either in conjunction with a prepared sewing rib or with a channeled rib, the resulting insole is strong enough to withstand all the stresses encountered in shoemaking. The tape is so securely held to the insole that a firm anchorage is formed for the stitches which later unite the sewing rib and the upper. Accordingly, it becomes unnecessary to use the large blocks or blanks of gem duck heretofore required and it is noteworthy that the amount of gem duck consumed in forming the tape 14 or 66, as the case may be, is no more than that which ordinarily has been thrown away as waste material after a block of gem duck has been trimmed to fit an insole. This results in lessening the cost of manufacturing shoes without in any way impairing their quality.

*Pleating the toe portion of the tape*

In the past considerable difficulty has been encountered in laying tape or gem duck around the inside of the sewing rib on an insole because the sharp curves at the toe portion are likely to cause ungainly bunching of the tape in that area, as shown in Fig. 4. This has been particularly troublesome when a heavy tape or duck has been used. As the tape is being laid along the relatively straight portions of the sewing rib it is maintained under tension which helps to lay the tape neatly and tightly along the insole. However, when it comes to turning the corner of the toe this tension necessarily lessens and the slack permits the tape to bulge.

I have discovered that when mechanism of the type illustrated in Figs. 5-10 is used, the inside tape about the toe is very neatly pleated in small, tight pleats or tucks which do not detract from the appearance of the insole and which are small enough and flat enough to present no obstacle to the curved needle later used to unite the sewing rib and the upper. Referring again to Fig. 13, the awl during its travel along the path B—C has a slight forward movement before the tape is actually penetrated. In the straight portions of the rib, the awl slides slightly over the surface of the tensioned tape 14, but when a corner is being turned at the toe and the tension on the tape slacks off, the awl does not slide over the tape but carries the tape along the insole for a short distance before penetrating it. I have found that the short, repeated jabs of the awl from the neat, tight pleats described above and that when the presser foot 52 and the hammer come down upon these pleats, they are still further bound down and flattened out. Accordingly, tion of the awl 30 and the hammer 48 may be insole 70 wherein the tap 72 is secured to the insole even though it is not found desirable to form loop stitches with the thread 54, the combination used by themselves to considerable advantage in order to pleat the tape whenever the tension on it slacks off. The result is shown in Fig. 15 which is a small section taken through the toe of an sole only by cement, but where an awl and hammer have been used to form the pleats 74 as above described.

Having thus described and illustrated my invention, what I claim as new and desire to secure by Letters Patent of the United States is:

1. As an article of commerce, a coil of insole ribbing comprising a flat core strip, a thin tape, and a thick tape, the tapes being stitched to opposite sides of the core strip, the thin tape being folded back on the core strip and the thick tape extending beyond one edge of the core strip, and a coating of cohesive cement applied to the exposed surface of the thin tape and to the inner face of the thick tape, whereby the combined ribbing thus formed may be wound in a coil without placing cement coated surfaces in contact.

2. As an article of commerce, prepared ribbing for insoles, comprising a core strip, and two tapes, the tapes being sewn to opposite sides of the core strip, one tape extending beyond one edge of the core strip, the other tape being folded back on the core strip, and a coating of cohesive cement applied to the exposed face of the folded tape and to that surface of the other tape which faces in the same direction as the coated surface of the folded tape.

3. A sewing rib for use in shoemaking, which comprises a core strip, tapes coated on one surface with cohesive cement and stitched to the outer sides of the core strip below the center thereof with their cemented sides against the core strip, one of said tapes extending below the edge of the core strip, the other tape being folded back against the side of said strip, whereby one side of the article thus formed presents a cement coating and the other side is free from cement.

4. A coiled, prepared sewing ribbing for innersoles, which comprises a core strip, two tapes each coated on one surface with cohesive cement, stitching uniting the core and the tapes, one of said tapes extending below the edge of the strip and the other tape being folded back on said strip, the cement coating on the tapes being exposed on only one surface of the ribbing thus formed, whereby the ribbing may be coiled upon itself without sticking the turns together.

5. An insole comprising a blank of insole material cut to proper shape, a sewing rib cemented around the margin of the insole blank, the sewing rib comprising an upright core strip, a thick tape having a flange secured to the insole and an upright portion covering the lower half of the inside of the core strip, a thin tape having a flange secured to the insole and an upright portion covering the lower half of the outside of the core strip, and a line of stitching securing the tapes to the core strip.

6. A sewing rib for an insole, comprising an upright core strip, tapes sewn to the core strip and covering only the lower part thereof, and flanges formed by said tapes and disposed substantially at right angles to the core strip.

7. A process of shoemaking which comprises providing a sewing rib having base flanges, progressively cementing the flanges of said rib to the margin of the insole, and simultaneously further securing one base flange to the innersole by pushing loops of adhesively coated thread through the base flange and partially into the material of the innersole at an acute angle, applying pressure to each loop as it is formed and before the loop forming needle is withdrawn.

8. A process of shoemaking, which comprises progressively cementing to an innersole a sewing rib having base flanges, and simultaneously securing one of said flanges to the innersole by pushing loops of thread through the flange and obliquely into the body of the innersole and beneath its surface.

9. A process of reinforcing an insole which comprises laying a tape along the outer surface of the insole and spaced from the edge thereof, forming a hole extending through the tape at an acute angle and partially into the insole, inserting a loop of adhesive-coated thread in the hole, and applying pressure to collapse the sides of the hole upon the thread.

10. A process of stitching a tape to an insole which comprises progressively laying the tape upon the insole and simultaneously forming a series of slanting awl holes extending through the tape and into the insole at an acute angle, depositing loops of thread in said holes, and collapsing the sides of the holes upon the deposited loops.

11. A process of shoemaking which comprises providing a sewing rib including a base flange, progressively laying said rib upon an insole, simultaneously forming a series of holes extending through the base flange and into the insole at an acute angle, depositing loops of thread in said holes, and pressing the sides of the holes upon the deposited loops of thread.

12. A process of shoemaking which comprises laying a reinforceing tape upon an insole and cohesively attaching it thereto in a step-by-step manner, simultaneously jabbing the tape with a sharp instrument to form small pleats, and progressively hammering the pleats flat.

13. As an article of commerce, a coil of insole ribbing comprising a fibrous core of substantially rectangular cross section with a tape secured in flat condition to one face and extending beyond one edge of the core, and a tape secured in folded condition to the other face and extending beyond the other edge of the core, said tapes presenting adhesive coated faces in one direction and uncoated faces in the other direction.

14. A process of making insoles which consists in providing a strip of sewing rib material having attaching flanges respectively of unequal thickness, cohesively securing said flanges to the surface of a flat insole, and then stabbing loops of thread through the thicker of the flanges thus formed, the loops extending into the body of the insole and at an acute angle beneath its surface.

ANDREW R. RIDDERSTROM.

---

CERTIFICATE OF CORRECTION.

Patent No. 2,343,226. February 29, 1944.

ANDREW R. RIDDERSTROM.

It is hereby certified that error appears in the printed specification of the above numbered patent requiring correction as follows: Page 1, second column, line 41, after "having" insert --a full--; page 4, first column, line 60, for "from" read --form--; line 64, beginning with the syllable and words "tion of the" strike out all to and including the word and period "described." in line 75, and insert instead the following -

> even though it is not found desirable to form loop stitches with the thread 54, the combination of the awl 30 and the hammer 48 may be used by themselves to considerable advantage in order to pleat the tape whenever the tension on it slacks off. The result is shown in Fig. 15 which is a small section taken through the toe of an insole 70 wherein the tape 72 is secured to the insole only by cement, but where an awl and hammer have been used to form the pleats 74 as above described.

and that the said Letters Patent should be read with this correction therein that the same may conform to the record of the case in the Patent Office.

Signed and sealed this 16th day of May, A. D. 1944.

(Seal)

Leslie Frazer

Acting Commissioner of Patents.

obliquely into the body of the innersole and beneath its surface.

9. A process of reinforcing an insole which comprises laying a tape along the outer surface of the insole and spaced from the edge thereof, forming a hole extending through the tape at an acute angle and partially into the insole, inserting a loop of adhesive-coated thread in the hole, and applying pressure to collapse the sides of the hole upon the thread.

10. A process of stitching a tape to an insole which comprises progressively laying the tape upon the insole and simultaneously forming a series of slanting awl holes extending through the tape and into the insole at an acute angle, depositing loops of thread in said holes, and collapsing the sides of the holes upon the deposited loops.

11. A process of shoemaking which comprises providing a sewing rib including a base flange, progressively laying said rib upon an insole, simultaneously forming a series of holes extending through the base flange and into the insole at an acute angle, depositing loops of thread in said holes, and pressing the sides of the holes upon the deposited loops of thread.

12. A process of shoemaking which comprises laying a reinforceing tape upon an insole and cohesively attaching it thereto in a step-by-step manner, simultaneously jabbing the tape with a sharp instrument to form small pleats, and progressively hammering the pleats flat.

13. As an article of commerce, a coil of insole ribbing comprising a fibrous core of substantially rectangular cross section with a tape secured in flat condition to one face and extending beyond one edge of the core, and a tape secured in folded condition to the other face and extending beyond the other edge of the core, said tapes presenting adhesive coated faces in one direction and uncoated faces in the other direction.

14. A process of making insoles which consists in providing a strip of sewing rib material having attaching flanges respectively of unequal thickness, cohesively securing said flanges to the surface of a flat insole, and then stabbing loops of thread through the thicker of the flanges thus formed, the loops extending into the body of the insole and at an acute angle beneath its surface.

ANDREW R. RIDDERSTROM.

CERTIFICATE OF CORRECTION.

Patent No. 2,343,226. February 29, 1944.

ANDREW R. RIDDERSTROM.

It is hereby certified that error appears in the printed specification of the above numbered patent requiring correction as follows: Page 1, second column, line 41, after "having" insert --a full--; page 4, first column, line 60, for "from" read --form--; line 64, beginning with the syllable and words "tion of the" strike out all to and including the word and period "described." in line 75, and insert instead the following -

> even though it is not found desirable to form loop stitches with the thread 54, the combination of the awl 30 and the hammer 48 may be used by themselves to considerable advantage in order to pleat the tape whenever the tension on it slacks off. The result is shown in Fig. 15 which is a small section taken through the toe of an insole 70 wherein the tape 72 is secured to the insole only by cement, but where an awl and hammer have been used to form the pleats 74 as above described.

and that the said Letters Patent should be read with this correction therein that the same may conform to the record of the case in the Patent Office.

Signed and sealed this 16th day of May, A. D. 1944.

(Seal)

Leslie Frazer
Acting Commissioner of Patents.